United States Patent [19]

Everhard et al.

[11] Patent Number: 4,707,908

[45] Date of Patent: Nov. 24, 1987

[54] METHOD AND TOOL FOR INSERTING A CLIP

[76] Inventors: Paul R. Everhard, 252 Southpoint Dr.; Roy K. Monroe, 100 Loch Lomond Dr., both of Lexington, Ky. 40503

[21] Appl. No.: 862,038

[22] Filed: May 12, 1986

[51] Int. Cl.[4] ........................ B23P 19/00; B23P 19/04; B23P 19/08

[52] U.S. Cl. ................................ 29/526 R; 29/243.5; 29/243.56; 29/432; 227/119; 227/139; 227/145

[58] Field of Search .................. 29/243.5, 243.56, 432, 29/526 R; 227/119, 139, 140, 145

[56] References Cited

U.S. PATENT DOCUMENTS

| | | | |
|---|---|---|---|
| Re. 27,591 | 3/1973 | Munse | 29/243.56 |
| 2,176,116 | 10/1939 | Baetzhold et al. | 29/243.56 |
| 3,040,328 | 6/1962 | Saltz | 227/145 |
| 3,672,029 | 6/1972 | Butriss | 29/243.56 |
| 3,742,577 | 7/1973 | Buttriss | 29/243.56 |
| 4,353,157 | 10/1982 | Sato | 29/243.56 |
| 4,625,380 | 12/1986 | Everhard et al. | 29/243.56 |

*Primary Examiner*—Howard N. Goldberg
*Assistant Examiner*—Taylor J. Ross
*Attorney, Agent, or Firm*—Frank C. Leach, Jr.

[57] ABSTRACT

A J-nut, which is a clip having a crown on one side, is inserted into a hole in a portion of an element in a single plane so that portions of the clip are on opposite sides of the portion having the hole with the J-nut having its crown, which may have a greater thickness than the remainder, either above or below the remainder of the J-nut. The J-nut is inserted by a tool having a locator disposed within the hole after the J-nut has been advanced to a position in the tool in which a portion of the J-nut is positioned within a passage within the locator. When the crown is on the bottom of the J-nut, the crown rests within this locator passage. The J-nut is oriented with the crown either up or down even though all the J-nuts are fed from a feeder in the same orientation. The locator is not positioned in the hole in the element until the J-nut is positioned with a portion within the locator passage. The tool also has a flat surface to rest on the portion of the element having the hole to further aid in orienting the tool. The J-nut is advanced into the hole by rotation of discs engaging a portion of the J-nut. The tool also may insert a J-nut over an edge of an element at a predetermined position.

20 Claims, 30 Drawing Figures

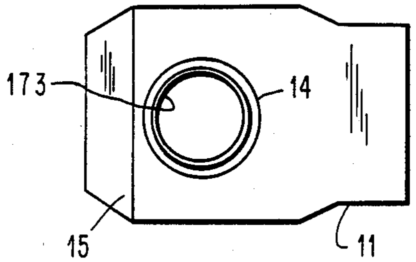
FIG. 8
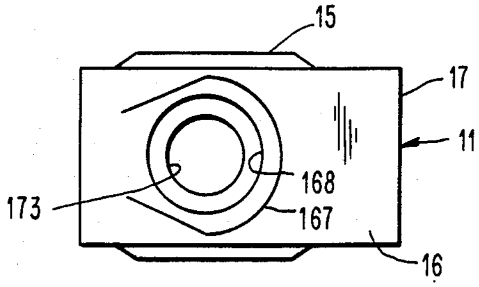
FIG. 26
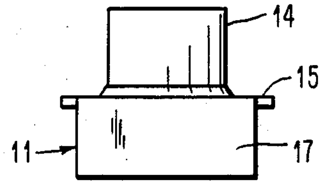
FIG. 7
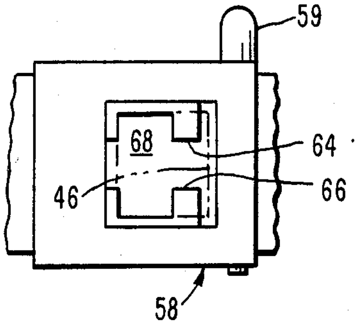
FIG. 10
FIG. 9
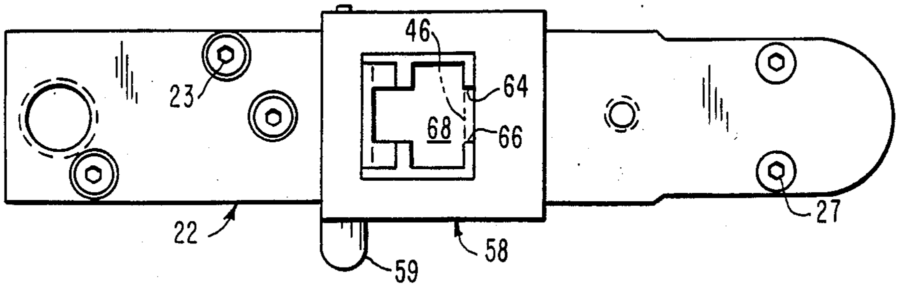

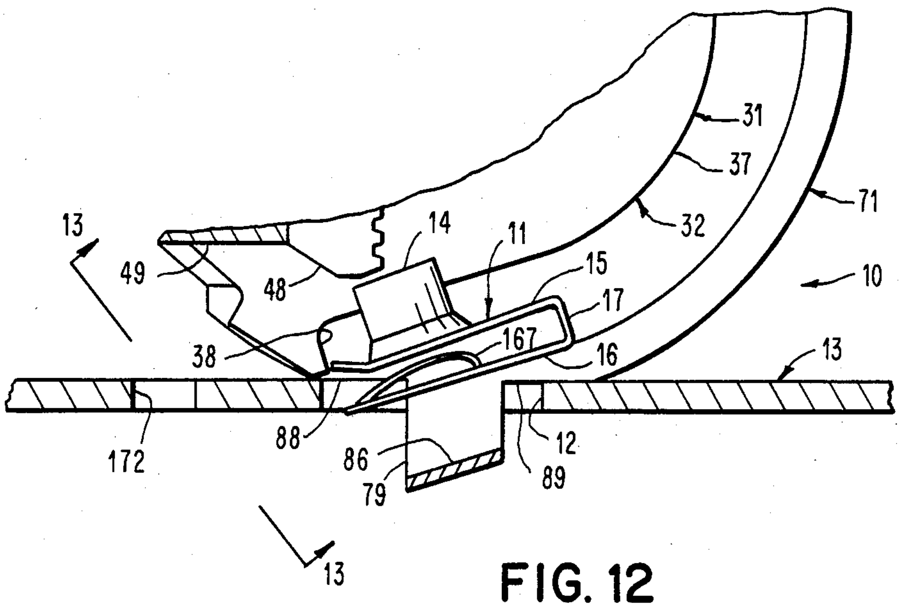
FIG. 12
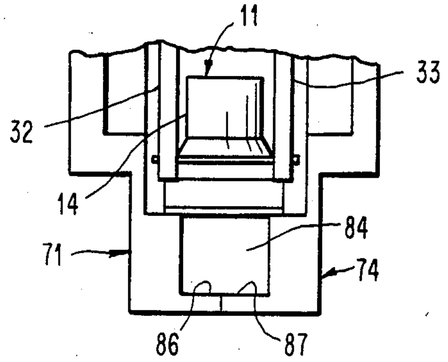
FIG. 13
FIG. 17
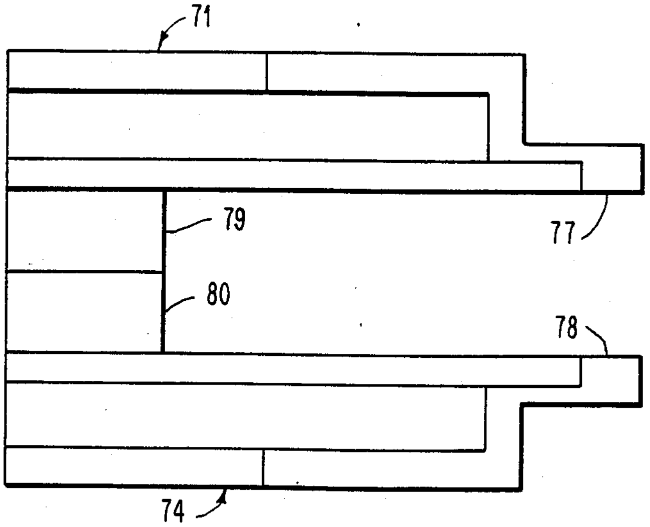

FIG. 27
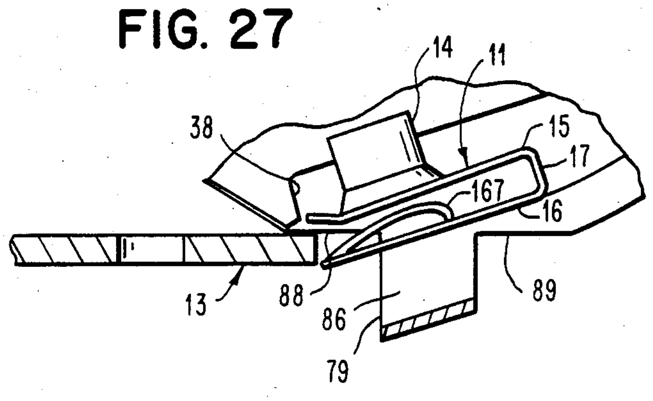
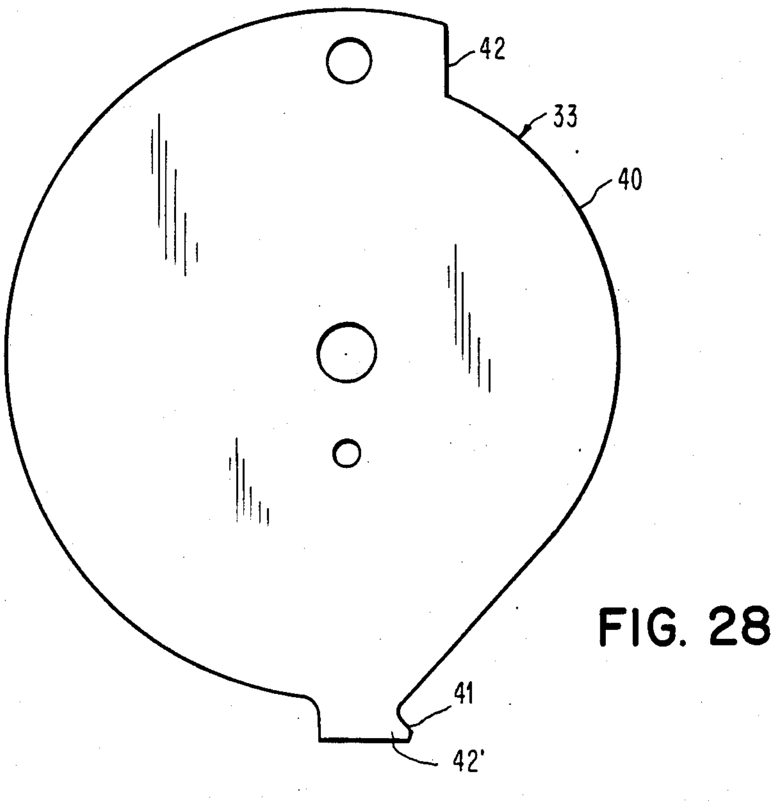
FIG. 28

METHOD AND TOOL FOR INSERTING A CLIP

This invention relates to a method and tool for inserting a clip into a hole in an element in a single plane or over an edge of an element and, more particularly, to a method and tool for inserting a J-nut so that its crown may be disposed on either side of the portion of the element on which the J-nut is mounted.

Our copending patent application for "Clip Insert Tool," Ser. No. 711,020, filed Mar. 12, 1985, now U.S. Pat. No. 4,625,380, is incorporated by reference herein. The tool of our aforesaid application inserts a clip into a hole in a portion of an element in a single plane, into a hole at an intersection of two substantially perpendicular portions of an element, or over an edge of an element.

A radiator of an automobile is mounted in position through the use of retaining clips known as J-nuts. The J-nut has a hollow crown on one side with a threaded passage with the crown extending from one of two elongated portions of the J-nut that are disposed on opposite sides of the portion of the element on which the J-nut is mounted. The crown may be thicker than the remainder of the J-nut.

The J-nuts must be inserted after the radiator is mounted on a radiator support of an automobile. The J-nuts have been manually inserted into holes in the radiator support because of the difficulty of positioning the crown of the J-nut through the hole when the crown is on the bottom side of the J-nut as it must be in certain installations. This is due to the hole being smaller than the overall dimension of the J-nut. When the crown is on the top side of the J-nut, it is not as difficult to insert the J-nut into position since the crown does not have to pass through the hole.

However, the installer also is faced with permanent injury, particularly to the thumb, from forcing the J-nut into the hole manually and due to the large number that must be installed in a short period of time (twelve per minute). Additionally, the fingers can be injured through pinching or cutting when inserting the J-nuts. Therefore, the installer must wear gloves to protect the hands, and this increases the time for installing the J-nuts because of the reduced dexterity.

After the J-nut has been disposed in its predetermined position, a screw is passed through a hole in the radiator support, a hole in a portion of the J-nut remote from the crown, and an opening in a tab on the radiator and threaded into a threaded passage in the crown.

In addition to inserting J-nuts into holes, the installer also must position J-nuts over the edge of the same element having holes into which the J-nuts have been inserted. This is a further source of potential injury to the installer since the installer must exert a sufficient force to push the J-nut over the edge of the element.

The method and tool of the present invention substantially reduce the cost of inserting a J-nut into a hole in a portion of an element in a single plane or over an edge of a portion of an element. This is accomplished through automatically inserting each J-nut after the tool is properly positioned relative to the hole in which the J-nut is to be inserted or to the edge of the element over which the J-nut is to be inserted. This also eliminates the possibility of injury, either temporary or permanent, that occurs when manually installing J-nuts.

Because the crown of the J-nut may have to be either above or below the remainder of the J-nut during installation on the element, it is necessary for the tool to be capable of inserting a J-nut with its crown either above or below the remainder of the J-nut even though all of the J-nuts are fed from a feeder with each J-nut having its crown in the same orientation. Otherwise, two different tools would be necessary to install the same J-nut with one for the crown up and the other for the crown down.

The tool of the present invention satisfactorily meets these requirements through being able to insert a J-nut into a hole in a portion of an element in a single plane with the crown of the J-nut either above or below the remainder of the J-nut. This is accomplished through either utilizing a reversible saddle on the tool to change the orientation of a plastic tube supplying the J-nut from a feeder to the tool in a specific orientation or rotating the end of the plastic tube remote from the tool through 180° by an air activated cylinder.

With the saddle, the installer would use the specific tool for installing all of the J-nuts at the same time with the crown above or below the remainder of the J-nuts. The change in orientation would normally only be made for a second tool connected to the same feeder, for example, although the same tool could be modified when desired. With the air activated cylinder, each of the J-nuts could be installed with the crown either above or below the remainder of the J-nut by the same tool with successive J-nuts having the crown above and below the remainder of the J-nuts, for example.

The tool is capable of inserting the J-nut irrespective of whether the crown is above or below the remainder of the J-nut. This is accomplished by having a portion of the J-nut enter a passage within locator means, which is disposed in the hole in which the J-nut is to be inserted only after the J-nut has been positioned in the tool at a selected position. When a J-nut is to be inserted over an edge of a portion of an element, the tool is positioned with orientation means, which also is used to aid in positioning the locator means of the tool for inserting a J-nut into the hole in the portion of the element in the single plane, on the portion of the element adjacent the edge over which the J-nut is to be inserted.

Therefore, it is only necessary for the user to position the tool properly with respect to the hole in which the J-nut is to be inserted or the edge of the element over which the J-nut is to be inserted with this positioning occurring with the J-nut in its selected position with a portion of the J-nut in the passage in the locator means. Then, with the tool properly positioned with the locator means in the hole or the orientation means properly located relative to the edge of the element, activation of a trigger automatically positions the J-nut within the hole with portions of the J-nut on opposite sides of the portion of the element and the crown on the correct side or positions the J-nut over the edge of the element.

An object of this invention is to provide a method and tool for inserting into a hole in an element in a single plane a clip having a crown either above or below the element.

Another object of this invention is to provide a method and tool in which the orientation of a clip can be selectively changed while still inserting the clip into a hole in an element in a single plane.

A further object of this invention is to provide a method and tool for inserting into a hole in an element in a single plane a clip having a crown in which the crown is inserted downwardly through the hole even though the overall length of the hole is smaller than the overall length of the clip.

A still further object of this invention is to provide a method and tool for positioning a clip having a crown either in a hole in an element in a single plane or over an edge of an element.

Other objects of this invention will be readily perceived from the following description, claims, and drawings.

This invention relates to a tool for inserting a clip having a crown on one side into a hole in a portion of an element in a single plane so that portions of an inserted clip engage opposite sides of the portion of the element at a predetermined position. The tool includes support means having disposition means for disposition in a hole in an element in which a clip is to be inserted with the support means having first passage means to receive a clip in a specific orientation. The disposition means has second passage means cooperating with the first passage means to receive a portion of a clip received in the first passage means with the clip being stopped at a selected position in the first passage means and the second passage means by stopping means. A stopped clip is advanced from its selected position in the first passage means and the second passage means into a hole in which the disposition means is disposed after the stopping means has stopped a clip by advancing means.

This invention also relates to a tool for inserting a clip having a crown on one side at a predetermined position on a portion of an element with portions of the clip on opposite sides of the portion of the element. The tool includes support means having orientation means for cooperating with a portion of an element that is to have portions of a clip disposed on opposite sides thereof at a predetermined position to orient the support means at a selected position relative to the portion of the element. The orientation means includes first means for disposition in a hole in a portion of an element in a single plane when the predetermined position of the clip is a clip inserted into the hole in the portion of the element in the single plane so that portions thereof are on opposite sides of a portion of an element and second means for engaging a portion of the element in the single plane having the hole and cooperating with the first means when the first means is disposed in the hole in the portion of the element in the single plane to orient the support means to insure that a clip is advanced into the hole so as to have portions thereof on opposite sides of the portion of the element in the single plane and to engage an edge of the hole. The second means engages a portion of the element when the predetermined position of a clip on opposite sides of an element is a clip inserted at an edge of a portion of an element so that portions thereof are on opposite sides of the portion of the element. The support means has first passage means to receive a clip in a specific orientation, and the first means of the orientation means has second passage means cooperating with the first passage means to receive a portion of a clip received in the first passage means. A clip is stopped at a selected position in the first passage means and the second passage means by stopping means. A stopped clip is advanced from its selected position in the first passage means and the second passage means to its predetermined position on opposite sides of the portion of the element by advancing means.

This invention further relates to a method of inserting into a hole in an element in a single plane a clip having a crown on one side including orienting a clip in a specific orientation in first passage means in support means of a tool and stopping a clip at a selected position in the first passage means and in second passage means in locator means of the support means of the tool, the second passage means cooperating with the first passage means to receive a portion of a clip. The locator means is disposed in a hole in an element in a single plane in which a clip is to be mounted after a clip is stopped at the selected position. A stopped clip is advanced from its selected position into a hole in an element in a single plane into which a stopped clip is to be inserted after the locator means has been disposed in the hole in which a stopped clip is to be inserted.

The attached drawings illustrate preferred embodiments of the invention, in which:

FIG. 7 is an end elevational view of a J-nut inserted by the tool of FIG. 1;

FIG. 8 is a top plan view of the J-nut of FIG. 7;

FIG. 9 is a top plan view of a mounting plate of the tool of FIG. 1 with the saddle in one position;

FIG. 10 is a fragmentary top plan view of a portion of the mounting plate of the tool of FIG. 1 with the saddle in the opposite position to FIG. 9 so that the crown of the J-nut is positioned beneath the remainder of the J-nut when inserted in position on an element by the tool;

FIG. 12 is a fragmentary sectional view of a portion of the tool of FIG. 1 and showing the stopped position of a J-nut prior to its insertion into a hole in an element with the crown above the remainder of the J-nut;

FIG. 13 is a fragmentary elevational view, similar to FIG. 6, of a portion of the tool shown in FIG. 12 with the rack, the bearing for the rack, and the element removed for clarity purposes and taken along line 13—13 of FIG. 12;

FIG. 17 is a top plan view of the locator plates of the tool of FIG. 1;

FIG. 26 is a bottom plan view of the J-nut of FIG. 7;

FIG. 27 is an enlarged fragmentary sectional view, partly in side elevation, of a portion of the tool of FIG. 1 and showing the J-nut partially positioned on an edge of an element;

FIG. 28 is a side elevational view of one of the wheel discs;

Figure 1:
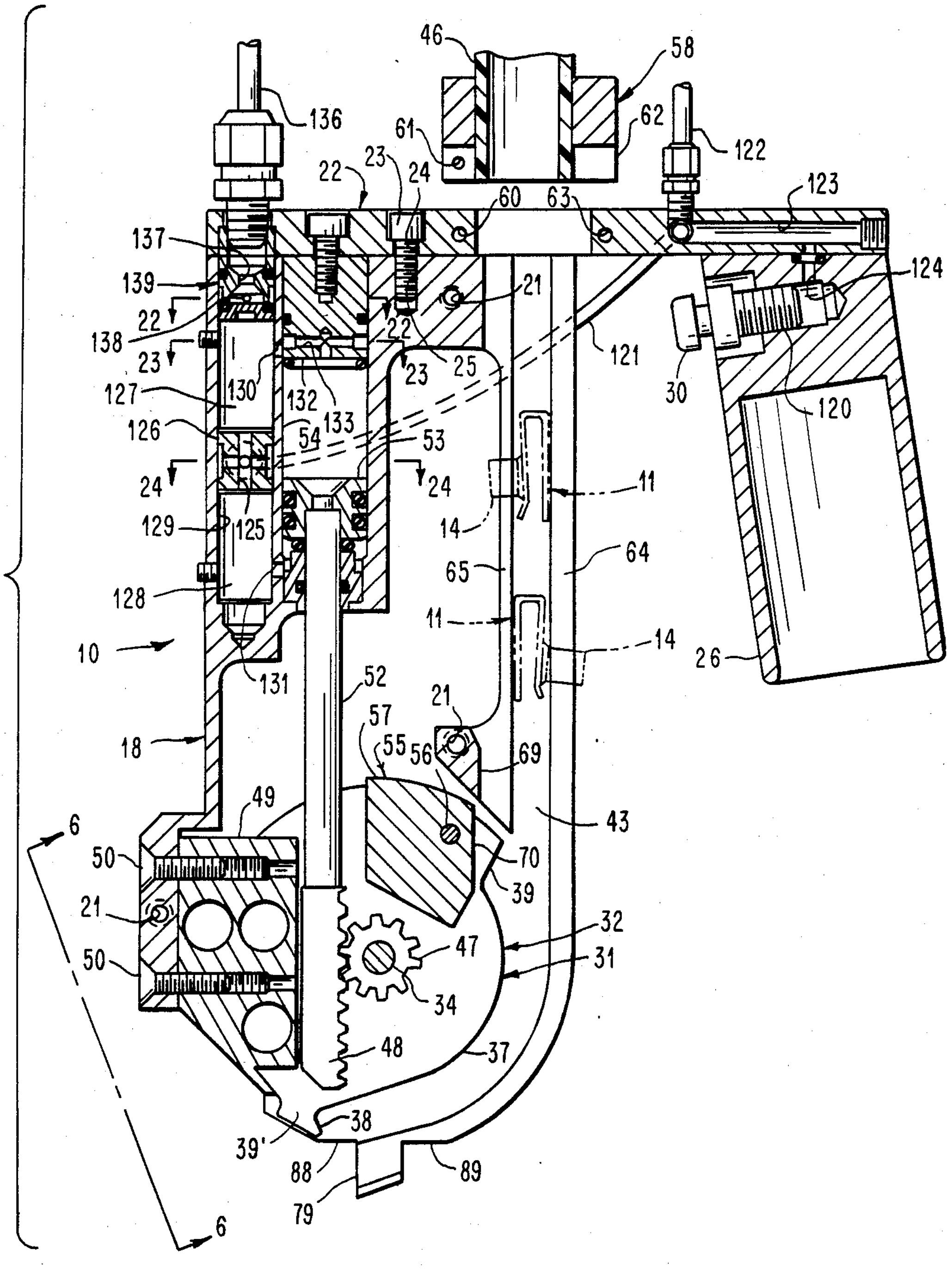
FIG. 1 is a sectional view, partly in elevation, of a tool of the present invention for inserting a clip and taken along line 1—1 of FIG. 4.

Referring to the drawings and particularly FIG. 1, there is shown a tool 10 for use in inserting a retaining clip such as a J-nut 11, for example, into a hole 12 (see FIG. 12) in a single plane portion of an element 13. The tool 10 also may be employed to insert the J-nut 11 over an edge of the element 13 as shown in FIG. 27. As shown in FIG. 12, the J-nut 11 includes a crown 14 extending from a portion 15 and a portion 16 spaced from the portion 15 and connected thereto by an integral portion 17.

The tool 10 (see FIG. 1) includes a base 18 and a cover plate 19 (see FIG. 2), which is removably secured to the base 18 by Allen screws 20 disposed in threaded openings 21 (see FIG. 1) in the base 18. When the cover plate 19 (see FIG. 2) is secured to the base 18, they may be deemed to constitute a body. The tool 10 includes a mounting plate 22 (see FIG. 1), which is attached to the top of the base 18 by Allen screws 23 extending through holes 24 in the mounting plate 22 into threaded holes 25 in the base 18.

Figure 11:
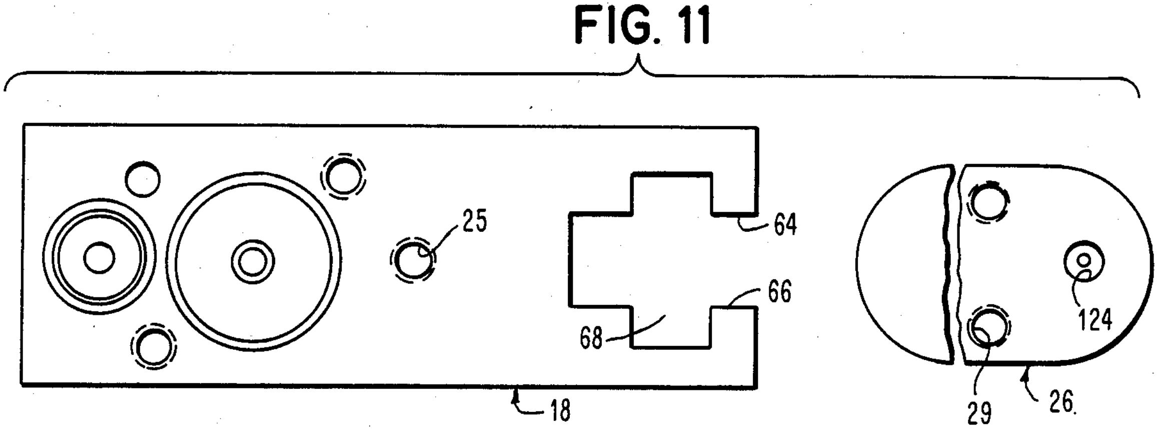
FIG. 11 is a top plan view of the tool of FIG. 1 with the mounting plate removed.

A handle 26 is supported by the mounting plate 22 through Allen screws 27 (see FIG. 9) extending through holes (not shown) in the mounting plate 22 and into threaded holes 29 (see FIG. 11) in the handle 26. The handle 26 has a button or trigger 30 (see FIG. 1) for activation by a user so that each activation of the trigger 30 causes one of the J-nuts 11 to be fed into the hole 12 (see FIG. 12) in a single plane portion of the element 13.

Figure 2:
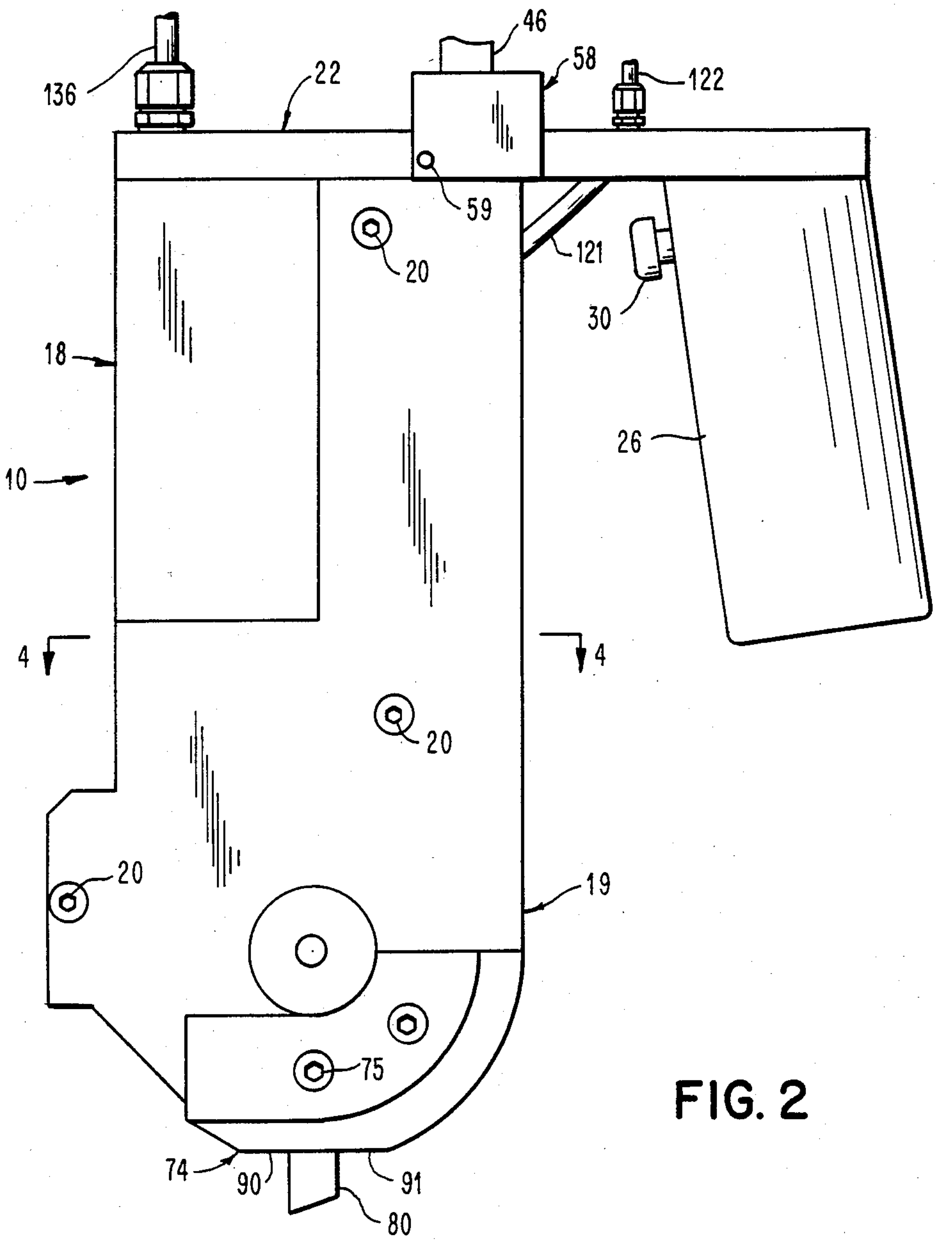
FIG. 2 is a front elevational view of the tool of FIG. 1.
Figure 6:
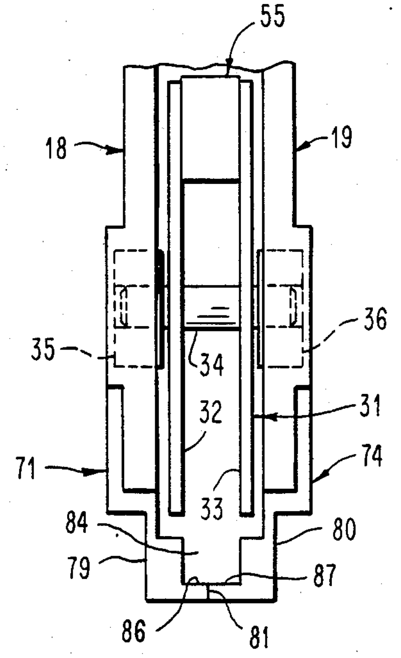
FIG. 6 is a fragmentary elevational view of a portion of the tool of FIG. 1 with the rack, the gear, and the bearing for the rack removed for clarity purposes and taken along line 6—6 of FIG. 1.

The tool 10 includes a wheel 31 (see FIG. 1), which is rotatably supported by the base 18 and the plate 19 (see FIG. 2). As shown in FIG. 6, the wheel 31 includes a pair of substantially parallel discs 32 and 33 secured to a shaft 34 for rotation therewith. The shaft 34 has one end rotatably supported in the base 18 by a bearing 35 and its other end supported in the plate 19 by a bearing 36.

As shown in FIG. 1, the disc 32 has a cut out portion 37 therein with end surfaces 38 and 39 at the opposite ends thereof. The disc 32 has a protrusion or projection 39' extending therefrom and forming the end surface 38.

The disc 33 (see FIG. 28) has a similar configuration of a cut out portion 40 with end surfaces 41 and 42 at the opposite ends thereof. The disc 33 has a protrusion or projection 42' extending therefrom and forming the end surface 41.

Figure 18:
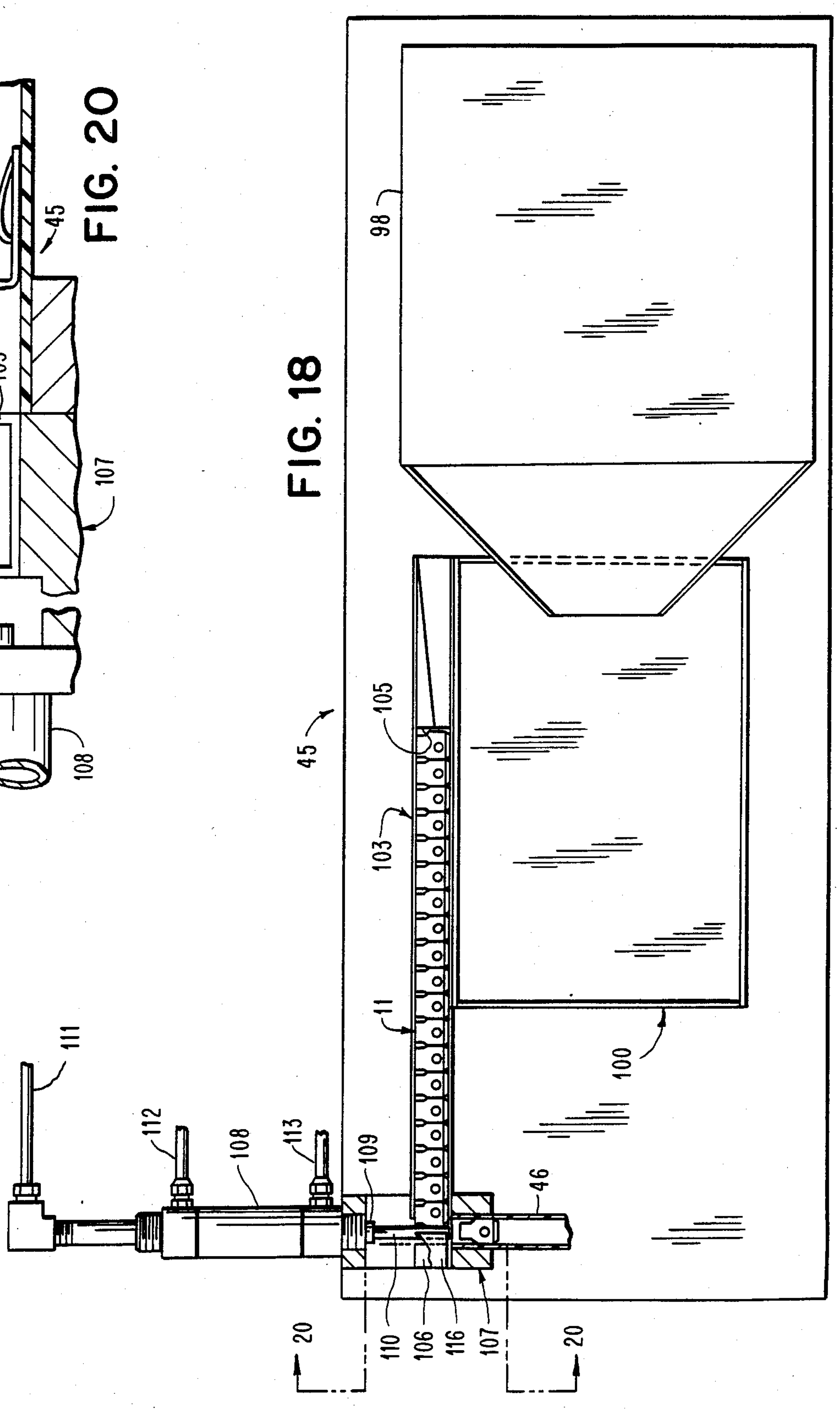
FIG. 18 is a schematic top plan view of a feeder mechanism used with the tool of the present invention to feed a clip to the tool in a desired orientation.

Thus, when the wheel 31 is in the position of FIG. 1, the end surface 38 of the disc 32 and the end surface 41 (see FIG. 28) of the disc 33 cooperate to function as a stop at a selected position for one of the J-nuts 11 (see FIG. 1) that is fed in an oriented relation thereto through a passage or track 43, which is formed between the cover plate 19 (see FIG. 2) and the base 18. The J-nut 11 (see FIG. 1) is supplied from a feeder mechanism 45 (see FIG. 18) through a rectangular shaped transfer tube 46 to the passage 43 (see FIG. 1). Feeding of the J-nut 11 from the feeder mechanism 45 (see FIG. 18) occurs when the wheel 31 (see FIG. 1) returns to the position of FIG. 1 after having advanced one of the J-nuts 11 into the hole 12 (see FIG. 12) in the element 13.

As shown in FIG. 1, the shaft 34 of the wheel 31 has a pinion gear 47 secured thereto. The pinion gear 47 has its teeth meshing with teeth on a rack 48, which is reciprocated to control the amount and direction of rotation of the wheel 31. When the rack 48 is moved upwardly, the wheel 31 rotates clockwise. Downward motion of the rack 48 rotates the wheel 31 counterclockwise. The rack 48 rides along a bearing shoe or guide 49, which is secured to the base 18 by flat head screws 50, to insure that the rack 48 moves along the desired path and maintains meshing engagement of its teeth with the teeth of the pinion gear 47.

The rack 48 includes an upper round portion functioning as a piston rod 52 of a piston 53, which is slidably supported in an air cylinder 54 in the base 18. The piston 53 has pressurized air supplied to one of its sides and removed from the other to control its direction or motion.

The wheel 31 has a weight 55 mounted between the discs 32 and 33 (see FIG. 6) by a pin 56 (see FIG. 1). The weight 55 has a curved surface 57 extending beyond the discs 32 and 33 (see FIG. 6) since it is desired for the weight 55 to add kinetic energy when the wheel 31 rotates clockwise from its position of FIG. 1 to its position in FIG. 16 to engage the J-nut 11.

Figure 14:
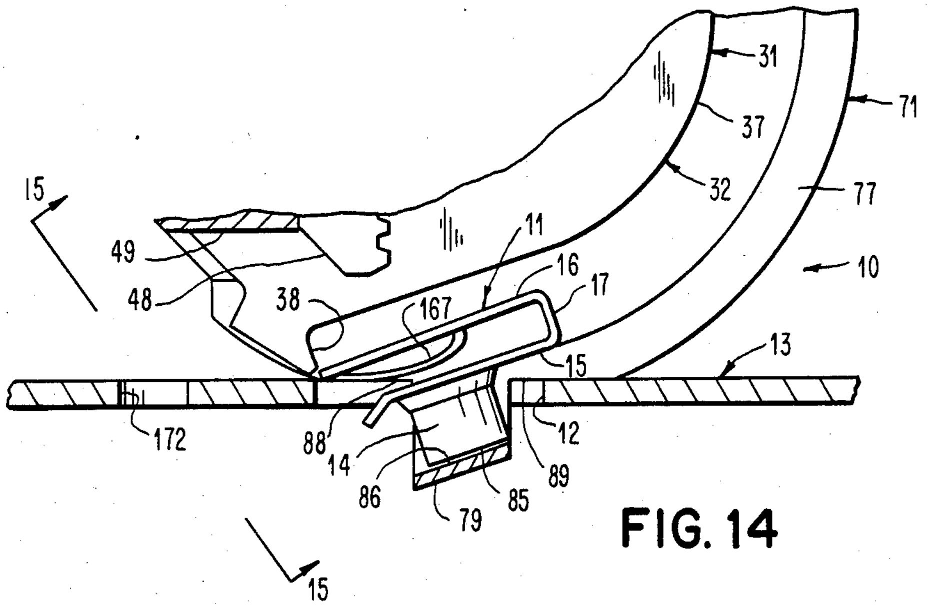
FIG. 14 is a fragmentary sectional view, similar to FIG. 12, of a portion of the tool of FIG. 1 and showing the position of a J-nut prior to its insertion on an element with the crown below the remainder of the J-nut.
Figure 16:
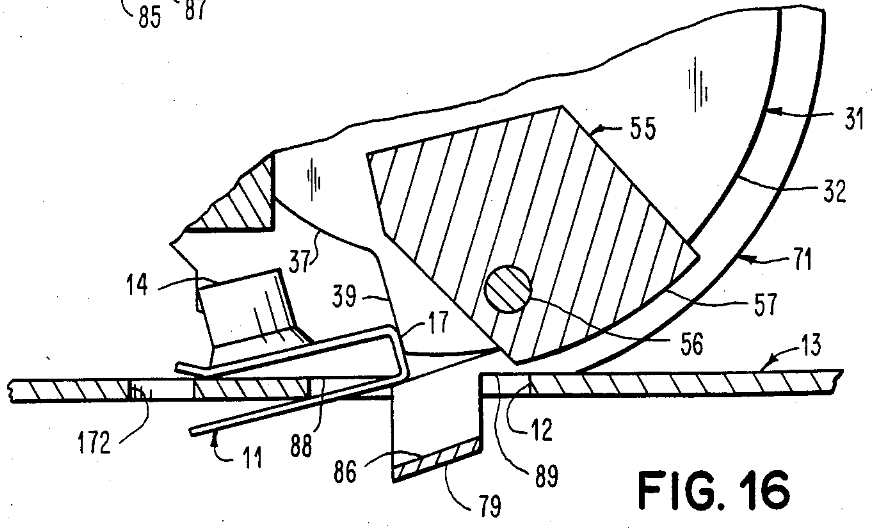
FIG. 16 is a fragmentary sectional view, similar to FIG. 12, and showing the J-nut advanced from the position of FIG. 12 until it is partially inserted on the element.

As previously mentioned, it may be necessary for the J-nut 11 to be positioned on the element 13 with the crown 14 beneath the remainder of the J-nut 11 as shown in FIG. 14 or the crown 14 above the remainder of the J-nut 11 as shown in FIG. 16. This is determined by the orientation of the J-nut 11 when it enters the passage 43 (see FIG. 1).

The orientation of the J-nut 11 is determined by the position of a saddle 58 on the mounting plate 22. The saddle 58 has the lower end of the tube 46 secured thereto by suitable adhesive such as an epoxy, for example.

When the saddle 58 is positioned on the mounting plate 22 so that a pin 59 (see FIG. 3) extends through a hole 60 (see FIG. 1) in the mounting plate 22 and holes 61 in flanges 62 of the saddle 58, the J-nut 11 is oriented so that the crown 14 (see FIG. 16) is above the remainder of the J-nut 11 when positioned on the element 13.

Figure 3:
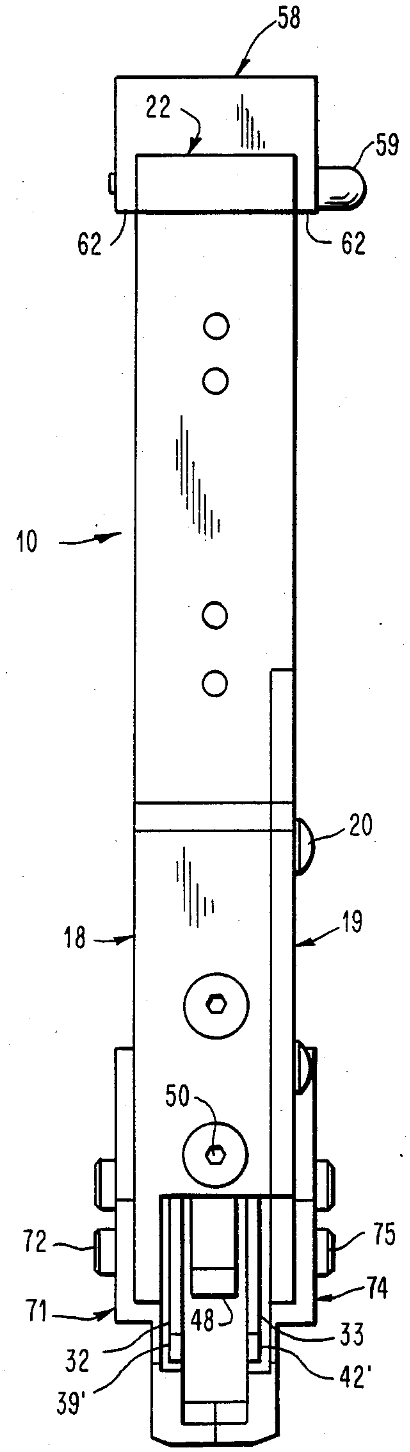
FIG. 3 is a side elevational view of the tool of FIG. 1 taken from the left side of FIG. 1.

As shown in FIG. 3, the flanges 62 of the saddle 58 abut opposite edges of the mounting plate 22.

When the saddle 58 is positioned on the mounting plate 22 so that the pin 59 extends through a hole 63 (see FIG. 1) in the mounting plate 22 and the holes 61 in the flanges 62 of the saddle 58, the J-nut 11 (see FIG. 14) is positioned on the element 13 so that the crown 14 is beneath the remainder of the J-nut 11. This is because this position of the saddle 58 (see FIG. 1) rotates the lower end of the tube 46 through 180°. This is possible because the tube 46 is plastic.

Figure 4:
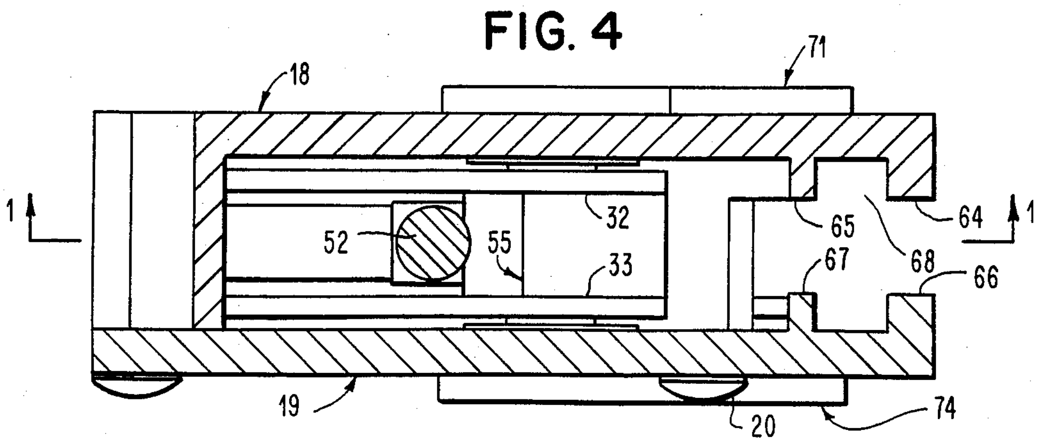
FIG. 4 is a sectional view of the tool of FIG. 1 and taken along line 4—4 of FIG. 2.

The passage 43 is formed so that it can accept the J-nut 11 with the crown 14 on either side of the J-nut 11. As shown in FIG. 4, the base 18 has projecting portions 64 and 65 spaced from each other, and the cover plate 19 has projecting portions 66 and 67 spaced from each other. The portions 64 and 66 are aligned with each other, and the portions 65 and 67 are aligned with each other.

Thus, when the crown 14 (see FIG. 14) is beneath the remainder of the J-nut 11 when mounted on the element 13, the crown 14 extends outwardly between the edges of the portions 64 (see FIG. 4) and 66 while the remainder of the J-nut 11 (see FIG. 12) rides in a rectangular shaped recess 68 (see FIG. 4), which is defined by the space between the portions 64 and 65 of the base 18, the space between the portions 66 and 67 of the cover plate 19, and the space connecting these two spaces.

When the J-nut 11 (see FIG. 12) is disposed on the element 13 so that the crown 14 is above the remainder of the J-nut 11, the crown 14 is positioned between the projecting portion 65 (see FIG. 4) of the base 18 and the projecting portion 67 of the cover plate 19 with the remainder of the J-nut 11 (see FIG. 12) in the recess 68 (see FIG. 4). The base 18 has a flat surface 69 (see FIG. 1) so that it will not interfere with the crown 14 of the J-nut 11 when the crown 14 is riding between the portion 65 (see FIG. 4) of the base 18 and the portion 67 of the cover plate 19. The weight 55 (see FIG. 1) has a flat surface 70 so that it also will not interfere with the crown 14 of the J-nut 11 when the crown 14 is riding between the portion 65 (see FIG. 4) of the base 18 and the portion 67 of the cover plate 19.

The base 18 has a stepped locator plate 71 attached thereto by Allen screws 72 (see FIG. 3) disposed in threaded openings (not shown) in the base 18. A stepped locator plate 74 is attached to the cover plate 19 by Allen screws 75 extending into threaded openings (not shown) in the cover plate 19.

The locator plate 71 has a projecting portion 77 (see FIG. 17) aligned at its upper end with the portion 64 (see FIG. 4) of the base 18 so as to form a continuation thereof while changing the path of travel of the J-nut 11 (see FIG. 12) approximately 90°. The locator plate 74 (see FIG. 17) has a projecting portion 78 aligned with the portion 66 (see FIG. 4) of the cover plate 19 so that it forms a continuation thereof to change the direction of travel of the J-nut 11 (see FIG. 12) approximately 90°.

The cut out portion 37 of the disc 32 replaces the projection 65 (see FIG. 4) of the base 18 insofar as aiding in guiding the J-nut 11 (see FIG. 12) within the locator plates 71 (see FIG. 4) and 74. Likewise, the cut out portion 40 (see FIG. 28) of the disc 33 replaces the projection 67 (see FIG. 4) of the cover plate 19 insofar as aiding in guiding the J-nut 11 within the locator plates 71 and 74.

The locator plates 71 and 74 have portions 79 (see FIG. 6) and 80, respectively, that abut each other at 81. The portions 79 and 80 cooperate to form locator means for disposition within the hole 12 (see FIG. 12) in the element 13. The hole 12 is circular, and the portions 79 and 80 (see FIG. 6) are shaped to fit within a portion of the circular hole 12 (see FIG. 12) and not be capable of movement relative thereto.

Figure 5:
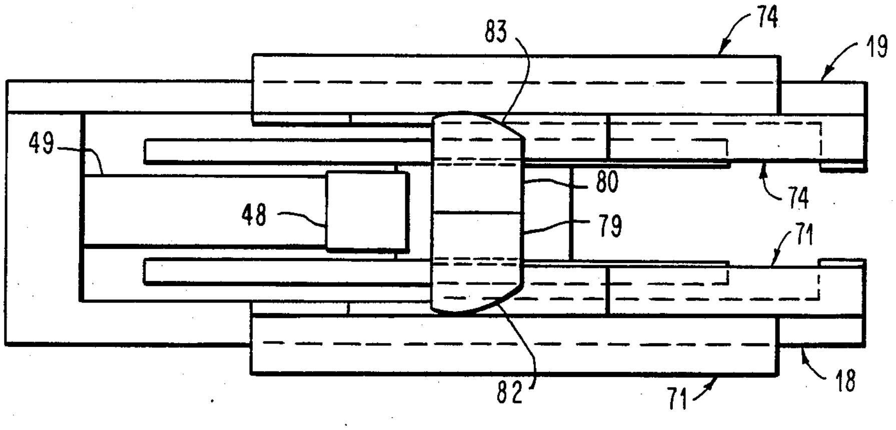
FIG. 5 is a bottom plan view of the tool of FIG. 1.

The portion 79 of the locator plate 71 has an outer arcuate surface 82 (see FIG. 5) with the same radius of curvature as the hole 12 (see FIG. 12) in the element 13. The portion 80 (see FIG. 5) of the locator plate 74 has an outer arcuate surface 83 with the same radius of curvature as the hole 12 (see FIG. 12) of the element 13. Thus, precise positioning of the portions 79 (see FIG. 5) and 80 of the locator plates 71 and 74, respectively, is obtained within the hole 12 (see FIG. 12) of the element 13. The radius of curvature of the arcuate surfaces 82 (see FIG. 5) and 83 of the portions 79 and 80 of the locator plates 71 and 74, respectively, is selected in accordance with the size of the hole 12 (see FIG. 12) in the element 13 in which the J-nut 11 is to be inserted.

As shown in FIG. 6, the portions 79 and 80 only abut at 81. This provides a passage 84 therein and within which the J-nut 11 is disposed as shown in FIG. 15 when the crown 14 is below the remainder of the J-nut 11 and in FIG. 13 when the crown 14 is above the remainder of the J-nut 11.

Figure 15:
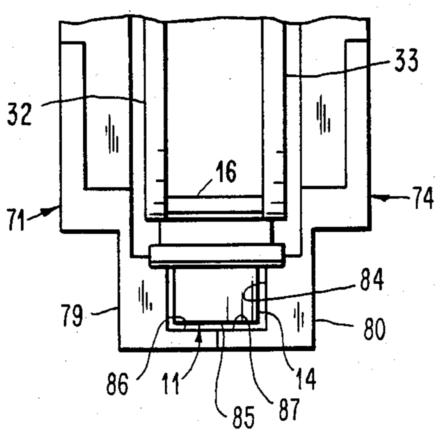
FIG. 15 is a fragmentary elevational view of a portion of the tool shown in FIG. 14 with the rack, the bearing for the rack, and the element removed for clarity purposes and taken along line 15—15 of FIG. 14.

When the crown 14 is below the remainder of the J-nut 11 as shown in FIG. 15, a surface 85 of the crown 14 is spaced slightly from a slanted surface 86 of the portion 79 of the locator plate 71 and a slanted surface 87 of the portion 80 of the locator plate 74 by the portion 15 (see FIG. 14) of the J-nut 11 resting on the projecting portion 77 of the locator plate 71 and the projecting portion 78 (see FIG. 17) of the locator plate 74 and the end of the portion 16 (see FIG. 14) of the J-nut 11 engaging the end surface 38 of the disc 32 and the end surface 41 (see FIG. 28) of the disc 33.

The locator plate 71 (see FIG. 12) has flat surfaces 88 and 89 on opposite sides of the portion 79 for disposition on top of the element 13. The locator plate 74 (see FIG. 2) has flat surfaces 90 and 91 on opposite sides of the portion 80 for disposition on top of the element 13 (see FIG. 12).

Thus, the tool 10 is oriented with respect to the hole 12 in the element 13 by the portions 79 (see FIG. 5) and 80 of the locator plates 71 and 74, respectively, along with the flat surfaces 88 (see FIG. 12) and 89 of the locator plate 71 and the flat surfaces 90 (see FIG. 2) and 91 of the locator plate 74. It should be understood that the portion 79 (see FIG. 5) of the locator plate 71 and the portion 80 of the locator plate 74 are not disposed within the hole 12 (see FIG. 12) in the element 13 until after the J-nut 11 is stopped by the discs 32 and 33 (see FIG. 6) in the position of FIGS. 12 or 14.

Figure 20:
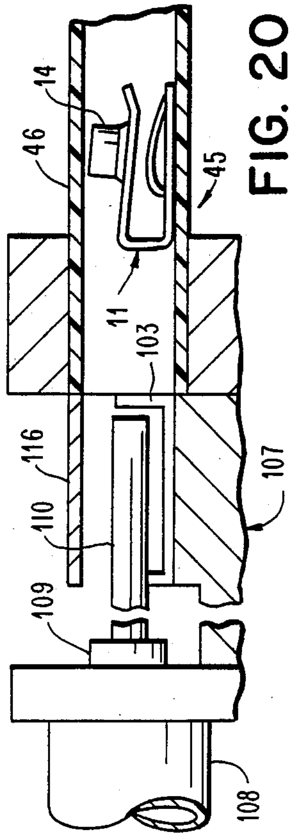
FIG. 20 is an end elevational view, partly in section, of a portion of the feeder mechanism of FIG. 18 and taken along line 20—20 of FIG. 18.
Figure 19:
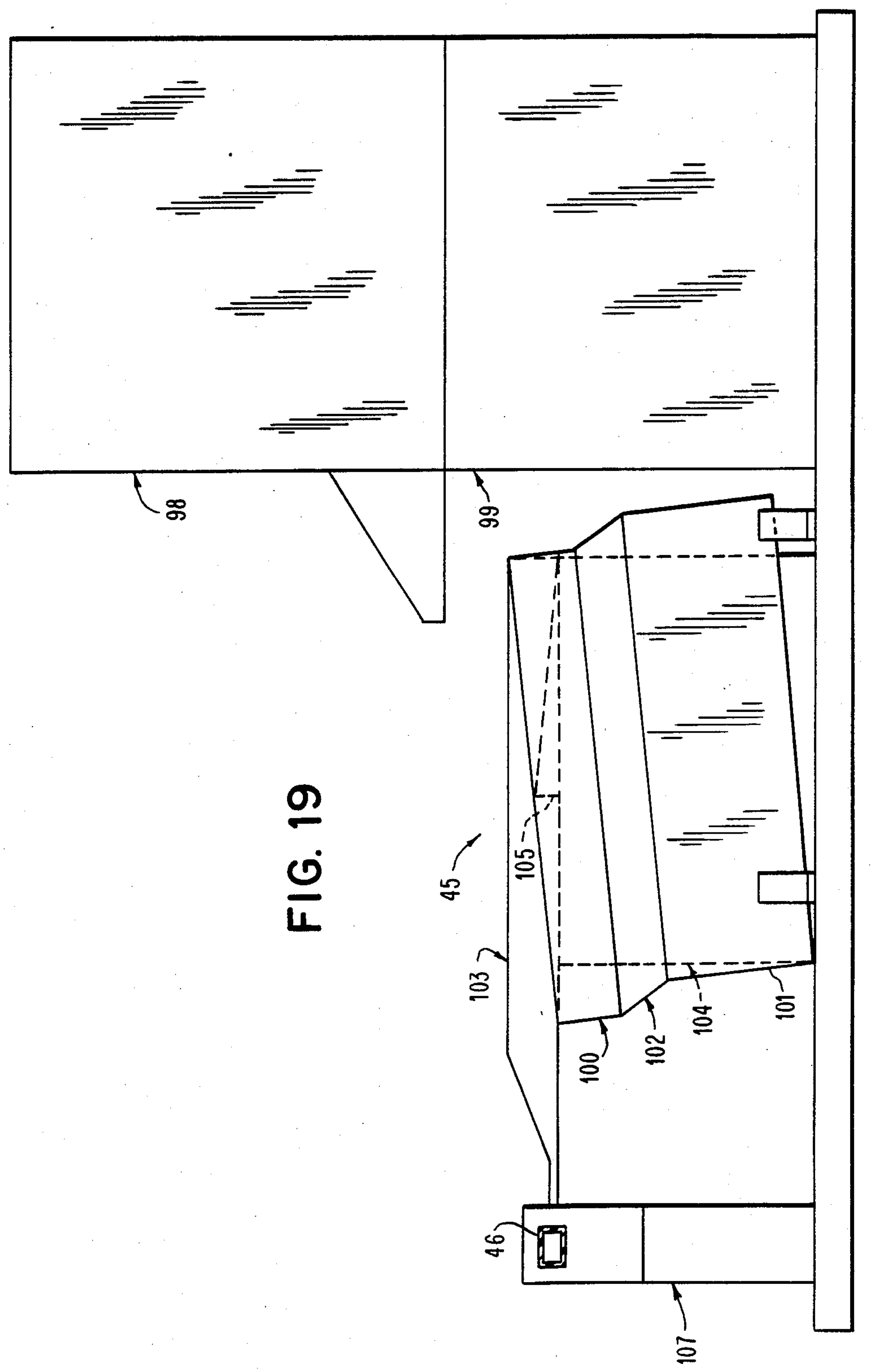
FIG. 19 is a side elevational view of the feeder mechanism of FIG. 18.

As previously mentioned, the feeder mechanism 45 (see FIGS. 18–20) feeds each of the J-nuts 11 in an oriented position to the transfer tube 46. The feeder mechanism 45 orients the J-nut 11 in the transfer tube 46 so that the crown 4 (see FIG. 12) is either above or below the remainder of the J-nut 11 depending on the position of the saddle 58 (see FIG. 1) on the mounting plate 22 of the tool 10.

When the saddle 58 is positioned as shown in FIG. 9, the J-nut 11 (see FIG. 12) is supplied with the crown 14 disposed so that it will be above the remainder of the J-nut 11 when inserted in the element 13. When the saddle 58 is in the position of FIG. 10, the crown 14 (see FIG. 14) of the J-nut 11 extends between the projecting portion 64 (see FIG. 10) of the base 18 and the projecting portion 66 of the cover plate 19 so that the J-nut 11 (see FIG. 14) will be inserted on the element 13 with the crown 14 beneath the remainder of the J-nut 11.

The feeder mechanism 45 (see FIG. 19) includes a hopper 98 having a vibrator 99 to cause the J-nuts 11 (see FIG. 18) to be fed from the hopper 98 to a recycler 100, which is connected to a vibrator 101 (see FIG. 19) by a connector 102. Thus, the recycler 100 is vibrated by the vibrator 101.

As each of the J-nuts 11 (see FIG. 18) enters a feed orienting track 103, which is supported on a vibrator 104 (see FIG. 19) for vibration thereby and has one end communicating with the recycler 100 to receive the J-nuts 11 (see FIG. 18), the J-nut 11 must be properly oriented with respect to the track 103 or it will be returned to the recycler 100. The feed orienting track 103 includes means to return to the recycler 100 any of the J-nuts 11 not properly oriented before the J-nut 11 passes a surface 105 of the track 103. The track 103 has a U-shaped configuration after the surface 105 is passed to hold the J-nuts 11 adjacent each other in proper orientation.

An abutment 106 is located just beyond the exit end of the track 103. The abutment 106 is carried by a vertical support mount 107. The mount 107 supports an air cylinder 108 having a hollow piston rod 109 extending therefrom towards the track 103. The hollow piston rod 109 has a hollow extension tube 110 attached thereto so that a passage extends through the hollow piston rod 109 and the hollow extension tube 110. The passage in the hollow piston rod 109 communicates with an air tube 111. The cylinder 108 has air tubes 112 and 113 connected thereto to allow air to be supplied to one side of a piston 114 (see FIG. 21) in the cylinder 108 having the hollow piston rod 109 extending from both sides and air to be removed from the other side of the piston 114.

The extension tube 110 normally blocks the track 103 (see FIG. 18) to prevent any of the J-nuts 11 from advancing to the position in which it engages the abutment 106. However, when pressurized air is supplied through the air tube 113 to one side of the piston 114 (see FIG. 21) from a pressurized air source 115 and vented to the atmosphere from the other side of the piston 114 through the air tube 112, the extension tube 110 is withdrawn from blocking the track 103 (see FIG. 18) so that the J-nut 11 engages the abutment 106. Thus, when pressurized air is supplied from the source 115 (see FIG. 21) to the air tube 112 and the air tube 113 is vented, the J-nut 11 (see FIG. 18), which is engaging the abutment 106, is advanced into the transfer tube 46. Shortly thereafter, air from the source 115 (see FIG. 21) is supplied through the air tube 111 and along the aligned passages in the hollow piston rod 109 and the hollow extension tube 110 to blow the J-nut 11 (see FIG. 18) along the transfer tube 46 to the track 43 (see FIG. 1) in the tool 10.

The abutment 106 (see FIG. 18) supports a plate 116 extending from the abutment 106 towards the track 103. The plate 116 terminates in a plane that passes through the axis of the aligned passages in the hollow piston rod 109 and the hollow extension tube 110. Thus, the plate 116 overlies the J-nut 11 when the hollow extension tube 110 is retracted so as to hold down the J-nut 11 when it is moved into the transfer tube 46 by the hollow extension tube 110.

As previously mentioned, motion of the rack 48 (see FIG. 1) by movement of the piston 53 within the air cylinder 54 in the body 10 determines the direction of rotation of the wheel 31. Thus, when pressurized air is supplied from the source 115 (see FIG. 21) to act on the bottom of the piston 53 and withdrawn from acting on the top of the piston 53, one of the J-nuts 11 (see FIG. 12) is advanced into the hole 12 in the element 13. The wheel 31 (see FIG. 1) is rotated counterclockwise when pressurized air is supplied to the top of the piston 53 and removed from acting on the bottom of the piston 53 by venting. The upward movement of the rack 48 causes insertion of the J-nut 11 (see FIG. 12) into the hole 12 in the element 13 when the trigger 30 (see FIG. 1) is activated. When the trigger 30 is released, the rack 48 moves downwardly, and the wheel 31 is returned to the position of FIG. 1.

Thus, when one of the J-nuts 11 (see FIG. 12) is to be advanced into the hole 12 in the element 13 with the tool 10 (see FIG. 1) properly positioned, the trigger 30 is depressed to move a two-way control valve 120 (see FIG. 21), which is disposed within the handle 26 (see FIG. 1), to vent air tubes 121 (see FIG. 21) and 122 to the atmosphere to remove pressurized air therefrom. The tubes 121 and 122 communicate with the control valve 120 through a passage 123 (see FIG. 1) in the mounting plate 22 and a passage 124 in the handle 26.

Figure 23:
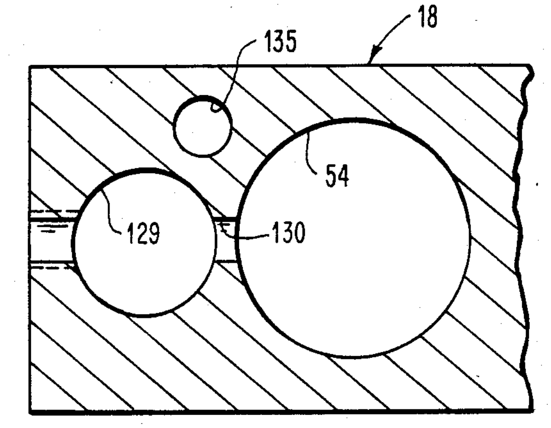
FIG. 23 is a sectional view of a portion of the tool of FIG. 1 with the piston stop and the control valve removed for clarity purposes and taken along line 23—23 of FIG. 1.

The venting of the air tube 121 (see FIG. 21) removes pressurized air from acting through passages 125 (see FIG. 1) in a pilot spacer 126 on three-way valves 127 and 128, which are supported in a chamber 129 in the base 18 on opposite sides of the pilot spacer 126 and inverted relative to each other, to allow the three-way valves 127 and 128 to shift positions. As a result of the three-way valves 127 and 128 shifting positions from those shown in FIG. 21, pressurized air from the source 115 is removed from acting on the top of the piston 53, which has the rack 48 (see FIG. 1) movable therewith, through a passage 130 (see FIG. 23) in the base 18 and is supplied to act on the bottom surface of the piston 53 (see FIG. 1) through a passage 131, which extends between the chamber 129 and the air cylinder 54 in the same manner as shown for the passage 130 in FIG. 23, in the base 18. This raises the rack 48 (see FIG. 1) so that the wheel 31 rotates clockwise to advance the J-nut 11 into the hole 12 (see FIG. 12) in the element 13 with the upward motion of the rack 48 (see FIG. 1) being stopped by a piston stop 132, which is disposed in the air cylinder 54 and has passages 133 communicating with the passage 130.

Figure 24:
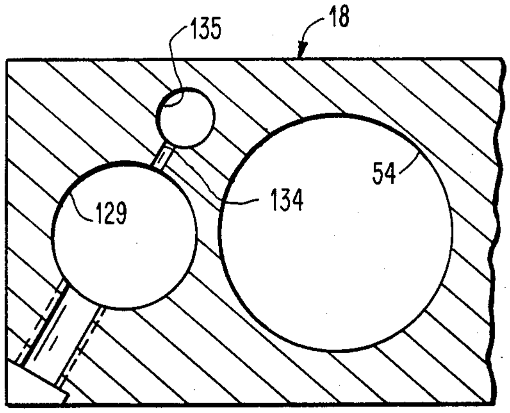
FIG. 24 is a sectional view of a portion of the tool of FIG. 1 with the pilot spacer and the piston removed for clarity purposes and taken along line 24—24 of FIG. 1.

Because of the presence of an orifice 134 (see FIG. 24) between a vertically extending air manifold 135 in the base 18 and one of the passages 125 (see FIG. 1) in the pilot spacer 126, which is disposed in the chamber 129, by means of which pressurized air from the source 115 (see FIG. 21) is supplied to act on the three-way valves 127 and 128, pressurized air is always available to act on the three-way valves 127 and 128. However, the orifice 134, which has a diameter of about 1/32", for example, is relatively small so that a much larger quantity of air vents through the air tube 121 than flows through the orifice 134 when the air tube 121 is vented. Thus, activation of the trigger 30 causes the feeding of the J-nut 11 (see FIG. 12) into the hole 12 in the element 13.

The air manifold 135 (see FIG. 22) in the base 18 has pressurized air supplied thereto from the source 115 (see FIG. 21) through an air tube 136 (see FIG. 1) and passages 137 and 138 in a spacer 139, which is at the top of the chamber 129, and a passage 140 (see FIG. 22) in the base 18. The passage 140 communicates with the passage 138 (see FIG. 1) in the spacer 139.

The bottom end of the air manifold 135 (see FIG. 22) also communicates with the three-way valve 128 (see FIG. 21) through a passage 141, which is substantially parallel to the passage 140 (see FIG. 22) in the base 18. This enables pressurized air to be supplied to the air cylinder 54 (see FIG. 1) in the base 18 through the passage 131. The pressurized air, which is supplied from the source 115 (see FIG. 21) through the passages 137 (see FIG. 1) and 138 in the spacer 139 to the air manifold 135 (see FIG. 22) in the body 18, also is supplied directly to the three-way valve 127 (see FIG. 1) since the air tube 136 communicates with the passage 137 in the spacer 139.

Figure 21:
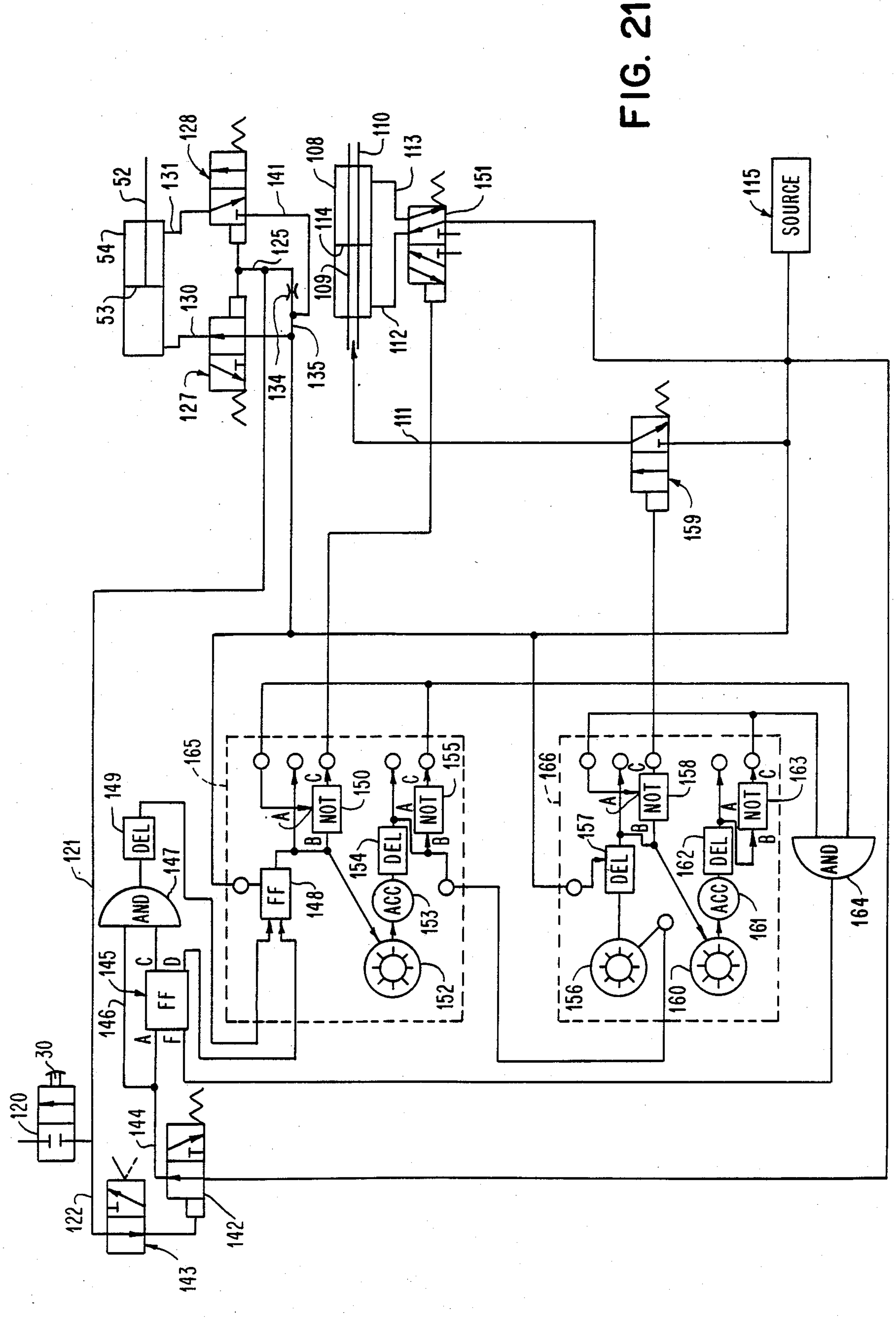
FIG. 21 is a schematic diagram of a pressurized air system for controlling various movements of the various portions of the tool of FIG. 1.
Figure 22:
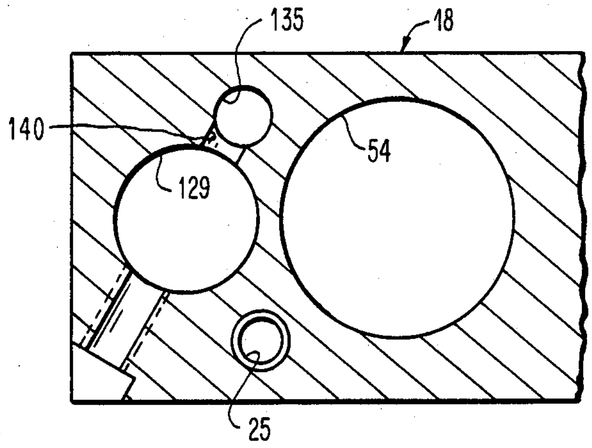
FIG. 22 is a sectional view of a portion of the tool of FIG. 1 with the spacer and the piston stop removed for clarity purposes and taken along line 22—22 of FIG. 1.

At the same time, pressurized air acting on a three-way control valve 142 (see FIG. 21) is vented to the atmosphere because it is connected to the air tube 122 through a manually operated three-way toggle valve 143, which is normally in the position shown in FIG. 21. The removal of pressurized air from acting on the control valve 142 results in venting of pressurized air in an air tube 144, which is connected to an input pin A of a flip flop 145. The venting of the air tube 144 also removes pressurized air from an air tube 146, which is one of two inputs to an AND gate 147.

The second input to the AND gate 147 is from an output pin C of the flip flop 145. Because an input pin F of the flip flop 145 is high from a prior cycle when the trigger 30 was released, the output pin C of the flip flop 145 goes low when the input pin A goes low because the high on the output pin F of the flip flop 145 resets the flip flop 145 when the input pin A goes low. This resetting of the flip flop 145 also results in an output pin D of the flip flop 145 going high. Thus, both inputs to the AND gate 147 go low when the trigger 30 is activated.

When the output pin D of the flip flop 145 goes high, a flip flop 148 is reset. This removes pressurized air from the output of the flip flop 148. This removal of pressurized air from the output of the flip flop 148 causes the input pin F of the flip flop 145 to go low.

When the trigger 30 is released, the control valve 120 shifts positions so that the air tubes 121 and 122 are no longer vented. This supplies pressurized air to act on the three-way valves 127 and 128 to shift their positions so that the wheel 31 (see FIG. 1) returns to its initial position because of the shifting of the air pressure to act on the top of the piston 53 rather than the bottom of the piston 53 to move the rack 48 downwardly.

The release of the trigger 30 also causes a high pneumatic signal to be supplied to the input pin A (see FIG. 21) of the flip flop 145 whereby its output pin C goes up. Therefore, both of the inputs to the AND gate 147 are high so that its output to a time delay valve 149 is high after a relatively short selected time delay. This high from the time delay valve 149 causes the output of the flip flop 148 to change state so that it goes up. When this occurs, a B input pin of a NOT gate 150 goes high.

When the NOT gate 150 has its input pin B go high with its input pin A low, its output pin C goes high. Since the NOT gate 150 has its input pin A low when the flip flop 148 supplies a high to the input pin B of the NOT gate 150, the NOT gate 150 supplies a high from its output pin C to act on a four-way control valve 151. This shifts the position of the valve 151 so that pressurized air from the source 115 is supplied through the air tube 113 and the air tube 112 is vented so that the piston 114 is moved to pull the hollow extension tube 110 at the end of the piston rod 109 away from the position in which it blocks advancement of the J-nuts 11 (see FIG. 18) along the track 103.

The high signal from the output of the flip flop 148 (see FIG. 21) also is supplied to a needle valve 152, which controls the flow rate, and an accumulator 153 to a time delay valve 154. The flow rate through the needle valve 152 determines a selected time period before the pressure in the accumulator 153 is sufficient to open the time delay valve 154 so that a high signal is supplied to an input pin B of a NOT gate 155 a relatively short time period after it is supplied to the B input pin of the NOT gate 150.

The NOT gate 155 has its input pin A always low since it is not connected to any pressurized air. Therefore, whenever the input pin B of the NOT gate 155 goes up, the NOT gate 155 has a high on its output pin C. This high on the output pin C of the NOT gate 155 is supplied to the input pin A of the NOT gate 150 to cause the NOT gate 150 to produce a low at its output pin C. When this occurs, the valve 151 has its position shifted to that shown in FIG. 21 whereby motion of the piston rod 109 causes ejection of the forwardmost J-nut 11 (see FIG. 18) into the transfer tube 46.

The high output from the time delay valve 154 (see FIG. 21) also is supplied to a needle valve 156, which controls the flow rate, from which it flows to a time delay valve 157, which delays the high signal to an input pin B of a NOT gate 158 for a relatively short selected time period. With the NOT gate 158 having its input pin A low, the NOT gate 158 has a high at its output pin C when its input pin B goes high.

This high signal from the output pin C of the NOT gate 158 acts on a three-way control valve 159. This shifts the position of the control valve 159 to cause supply of pressurized air from the source 115 through the air tube 111 and the passages in the hollow piston rod 109 and the hollow extension tube 110 to blow the J-nut 11 (see FIG. 18), which has been moved by the motion of the hollow piston rod 109 into the transfer tube 46, along the transfer tube 46 to its position against the wheel 31 (see FIG. 1).

The output from the time delay valve 157 (see FIG. 21) also is supplied through a needle valve 160, which controls the flow rate, and an accumulator 161 to a time delay valve 162. The flow rate through the needle valve 160 determines a selected time period before the pressure in the accumulator 161 is sufficient to open the time delay valve 162 so that the high signal to an input pin B of a NOT gate 163, which has its input pin A always low, is delayed for a relatively short selected time period. As a result, the NOT gate 163 has its output pin C go high a short time after the output pin C of the NOT gate 158 went up.

When the output pin C of the NOT gate 163 goes high to cause the input pin A of the NOT gate 158 to go up, the output pin C of the NOT gate 158 goes low to cause return of the control valve 159 to the position of FIG. 21. Thus, pressurized air from the source 115 is supplied for only a very short period of time to act on the J-nut 11 (see FIG. 18) in the transfer tube 46.

The output pin C (see FIG. 21) of the NOT gate 155 and the output pin C of the NOT gate 163 are the two inputs to an AND gate 164, which has its output connected to the input pin F of the flip flop 145. Therefore, when the pressurized air is no longer supplied to blow the J-nut 11 (see FIG. 18) down the transfer tube 46, a high is supplied to the input pin F (see FIG. 21) of the flip flop 145.

The toggle valve 143 is normally open. It is normally moved to a closed position whenever one of the J-nuts 11 (see FIG. 12) is jammed. The closing of the toggle valve 143 (see FIG. 21) allows only the rack 48 (see FIG. 1) to be moved when the trigger 30 is activated. This enables clearing of the J-nut 11 from its jammed position.

If the J-nut 11 is not fully inserted during the first activation of the trigger 30, the trigger 30 may be released and then pushed inwardly to cause reciprocation of the rack 48 to produce rotation of the wheel 31 without another of the J-nuts 11 being fed along the track 43. This activation and release of the trigger 30 must occur very rapidly.

This second activation of the trigger 30 without feeding another of the J-nuts 11 along the track 43 is possible because the flip flop 145 (see FIG. 21) cannot change state after the first activation of the trigger 30 until the output of the AND gate 164 goes high. When the trigger 30 is first activated to open the valve 120, the input pin A of the flip flop 145 goes down to reset the flip flop 145 because the input pin F of the flip flop 145 is high. When the flip flop 145 is reset, the output pin D of the flip flop 145 goes up to reset the flip flop 148. This removes pressurized air from the output of the flip flop 148 whereby the output of the AND gate 164 goes low so that the input pin F of the flip flop 145 goes low. The first release of the trigger 30 closes the valve 120 to cause the output of the flip flop 148 to supply pressurized air to start a cycle of operation in which the output of the AND gate 164 goes up at the end of the cycle of operation.

During the time between the output of the flip flop 148 supplying pressurized air because of release of the trigger 30 and the output of the AND gate 164 going up, the flip flop 148 cannot respond to a high output from the time delay valve 149 since the flip flop 148 must be reset again by a high from the output pin D of the flip flop 145. Therefore, if the trigger 30 is opened and closed rapidly, the rack 48 (see FIG. 1) can be reciprocated to cause the wheel 31 to first rotate counterclockwise (as viewed in FIG. 12) to advance the J-nut 11 into its desired position and then clockwise (as viewed in FIG. 12). While pressurized air is supplied during this rapid activation and release of the trigger 30 (see FIG. 1) through the passages 130 and 131 to alternately act on opposite sides of the piston 53 to cause reciprocation of the rack 48, there is no activation of the flip flop 148 (see FIG. 21) since it has already been set by the high from the time delay valve 149 and cannot be set again until after it is first reset by a high on the output pin D of the flip flop 145.

Thus, the flip flop 148 does not respond to the high signal from the time delay valve 149 until after the AND gate 164 has a high output, and this cannot occur until completion of the cycle of operation. Accordingly, this enables rapid opening and closing of the valve 120, if such is needed, to advance the J-nut 11 (see FIG. 12) into its desired position.

One suitable example of the two-way control valve 120 (see FIG. 21) is a two-way control valve sold by Humphrey Products, Kalamazoo, Mich. as model 2P. One suitable example of each of the three-way control valves 127 and 128 is a three-way control valve sold by Humphrey Products as model Y-125-IN. One suitable example of the three-way control valve 142 is a three-way control valve sold by Humphrey Products as model 3P combined with an air pilot operator sold by Humphrey Products as model 34A. One suitable example of the three-way toggle valve 143 is a three-way toggle valve sold by Humphrey Products as model 3V. One suitable example of the flip flop 145 is a flip flop sold by The Aro Corporation, Bryan, Ohio as model 59180. One suitable example of each of the AND gates 147 and 164 is an AND gate sold by The Aro Corporation as model 59111. One suitable example of the time delay valve 149 is the time delay valve sold by The Aro Corporation as model 59121. One suitable example of the four-way control valve 151 is a four-way control valve sold by Humphrey Products as model 4P combined with an air pilot operator sold by Humphrey Products as model 34A. One suitable example of the three-way control valve 159 is a three-way control valve sold by Humphrey Products as model 250A.

The portion of the pneumatic circuit of FIG. 21 within a block 165 is a module sold by The Aro Corporation as model 59895-L. The portion of the pneumatic circuit of FIG. 21 within a block 166 is a module sold by The Aro Corporation as model 59896-L.

While the J-nuts 11 (see FIG. 12) have been shown and described as being fed by the feeder mechanism 45 (see FIG. 18), it should be understood that such is not necessary for satisfactory operation of the tool 10 (see FIG. 1) of the present invention. That is, it is only necessary that the J-nut 11 be inserted into the passage 43 in an oriented relation whereby it will fall by gravity to the position in which it abuts the end surface 38 of the disc 32 and the end surface 41 (see FIG. 28) of the disc 33 with the crown 14 (see FIG. 12) either above or below the remainder of the J-nut 11 depending on the position of the saddle 58 (see FIG. 1) on the mounting plate 22.

Considering the operation of the tool 10 (see FIG. 12) when one of the J-nuts 11 is to be inserted within the hole 12 in the element 13, the tool 10 is positioned with the portions 79 (see FIG. 5) and 80 of the locator plates 71 and 74, respectively, within the hole 12 (see FIG. 12) in the element 13 and with the flat surfaces 88 and 89 of the locator plate 71 and the flat surfaces 90 (see FIG. 2) and 91 of the locator plate 74 on top of the element 13 as shown in FIGS. 12 and 14. In FIG. 12, the crown 14 of the J-nut 11 is disposed above the remainder of the J-nut 11 while the crown 14 is disposed beneath the remainder of the J-nut 11 in FIG. 14. It is necessary that the J-nut 11 be in the position of FIGS. 12 or 14 prior to inserting the portion 79 of the locator plate 71 and the portion 80 (see FIG. 2) of the locator plate 74 within the hole 12 (see FIG. 12) in the element 13.

Then, the trigger 30 (see FIG. 1) is pushed inwardly to cause the rack 48 to be raised upwardly to rotate the wheel 31 clockwise. With the J-nut 11 in the position of FIG. 12 or 14, clockwise rotation of the wheel 31 causes the end surface 39 (see FIG. 1) of the disc 32 and the end surface 42 (see FIG. 28) of the disc 33 to engage the portion 17 (see FIG. 16) of the J-nut 11. This forces the J-nut 11 into the hole 12 in the element 13 and onto opposite sides of the element 13 as shown in FIG. 16.

Figure 25:
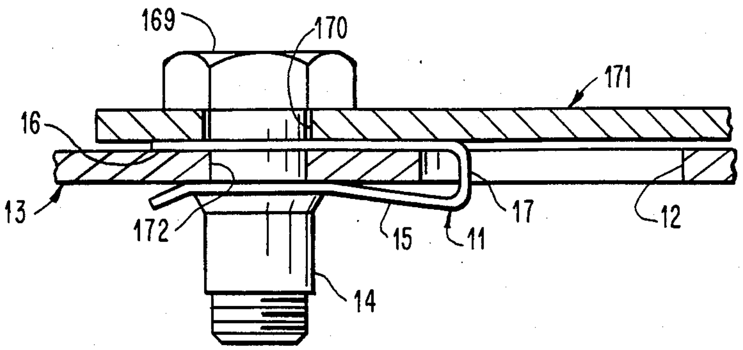
FIG. 25 is an enlarged fragmentary sectional view of a portion of an element and showing a J-nut attached thereto by a screw.

After the J-nut 11 has been advanced into the position in which it abuts portions of the edge of the circular hole 12 as shown in FIG. 25, the user releases the trigger 30 (see FIG. 1). This causes the rack 48 to move downwardly to rotate the wheel 31 counterclockwise to return the wheel 31 to the position of FIG. 1. After a slight time delay as controlled by the time delay valve 149 (see FIG. 21), the hollow extension tube 110 and the hollow piston rod 109 to which it is connected are retracted so that the hollow extension tube 110 does not block the track 103 (see FIG. 18) whereby the J-nut 11 is moved into engagement with the abutment 106.

After a relatively short time period as determined by the needle valve 152 (see FIG. 21) and the time delay valve 154, the hollow extension tube 110 is moved into engagement with the J-nut 11 (see FIG. 18) engaging the abutment 106 to eject the J-nut 11 from the track 103 and into the transfer tube 46.

With the J-nut 11 removed from the track 103 and disposed in the transfer tube 46, pressurized air is applied to the J-nut 11 through the aligned passages in the hollow piston rod 109 and the hollow extension tube 110 shortly after ejection of the J-nut 11 from the track 103. This time period is determined by the time delay valve 157 (see FIG. 21). The pressurized air blows the J-nut 11 (see FIG. 18) down the transfer tube 46 and into the passage 43 (see FIG. 1) for engagement against the end surface 38 of the disc 32 and the end surface 41 (see FIG. 28) of the disc 33 to control the position of the J-nut 11 (see FIG. 12).

The supply of the pressurized air to the aligned passages in the hollow piston rod 109 (see FIG. 18) and the hollow extension tube 110 is for a very short time period, which is determined by the needle valve 160 (see FIG. 21) and the time delay valve 162. When flow of the pressurized air through the aligned passages in the hollow piston rod 109 and the hollow extension tube 110 is stopped, a high signal is supplied to the input pin F of the flip flow 145. Thus, this is the desired condition of the flip flop 145 when the trigger 30 is again activated.

Since all of these pneumatic functions occur very rapidly, the trigger 30 can again be activated as soon as the portions 79 (see FIG. 5) and 80 of the locator plates 71 and 74, respectively, are positioned in another of the holes 12 (see FIG. 12) in the element 13 and the flat surfaces 88 and 89 of the locator plate 71 and the flat surfaces 90 (see FIG. 2) and 91 of the locator plate 74 disposed on top of the element 13 (see FIG. 12). Thus, the J-nuts 11 can be inserted very rapidly into the holes 12 in the element 13.

The portion 16 of the J-nut 11 has a portion 167 integral therewith but at an angle thereto so that the portion 167 travels with the portion 16 as the portion 16 is advanced relative to one side of the element 13. The portion 167 is disposed in the plane of the portion 16 when the J-nut 11 is moved into the position shown in FIG. 25.

With the J-nut 11 positioned as shown in FIG. 25, the portion 167 (see FIG. 14) of the J-nut 11 is in the plane of the portion 16 and has a hole 168 (see FIG. 26) therein to receive a screw 169 (see FIG. 25). The screw 169 initially passes through a hole 170 in a radiator support 171, for example, to which the element 13 is to be attached.

After the screw 169 passes through the hole 170 in the radiator support 171, it passes through the hole 168 (see FIG. 26) in the portion 167 of the J-nut 11 prior to passing through a hole 172 (see FIG. 25) in the element 13. The screw 169 then enters a threaded passage 173 (see FIG. 8) in the crown 14. It should be understood that the hole 168 (see FIG. 26) in the portion 167 of the J-nut 11 and the threaded passage 173 (see FIG. 8) in the crown 14 of the J-nut 11 are aligned with each other and have their centers on the same axis.

When the J-nut 11 is to be positioned over an edge of the element 13 at a predetermined position as shown in FIG. 27 rather than inserted into the hole 12 (see FIG. 12) in the element 13, the tool 10 must be positioned as shown in FIG. 27. That is, the flat surface 88 of the locator plate 71 and the flat surface 90 (see FIG. 2) of the locator plate 74 are disposed on a flat surface of the element 13 (see FIG. 27). Thus, FIG. 27 discloses the tool 10 utilized to position the J-nut 11 at a predetermined position over the edge of the element 13 rather than at a predetermined position by insertion of the J-nut 11 into the hole 12 (see FIG. 12) in the element 13.

It should be understood that the tool 10 (see FIG. 12) may be automatically positioned relative to the element 13 by a robot. With a robot, the trigger 30 (see FIG. 21), which is a push button, and the two-way control valve 120 would be replaced by a solenoid valve. It would still be necessary to position the portion 79 (see FIG. 5) of the locator plate 71 and the portion 80 of the locator plate 74 within the hole 12 (see FIG. 12) in the element 13 by the robot.

Figure 30:
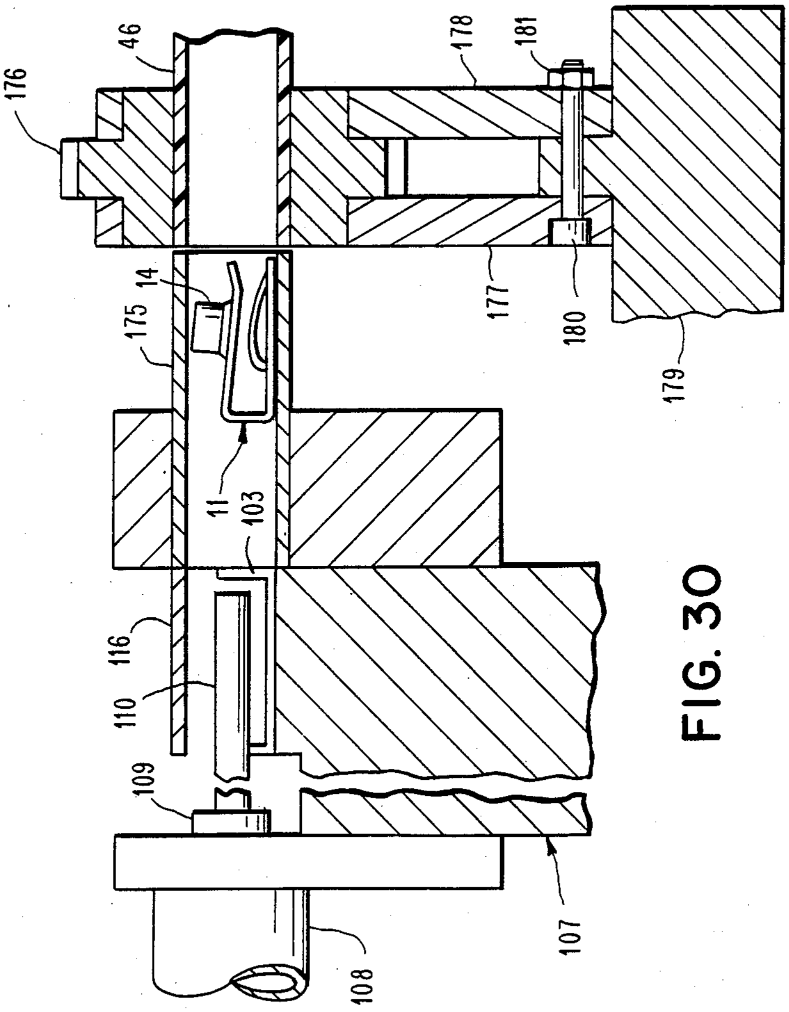
FIG. 30 is a sectional view of the modification of FIG. 29 and taken along line 30—30 of FIG. 29.

With a robot in particular, it is desired that the tool 10 be capable of inserting each of the J-nuts 11 with the crown 14 either above or below the remainder of the J-nut 11. Accordingly, the plastic transfer tube 46 (see FIG. 30) is terminated prior to the mount 107, and a steel rectangular shaped transfer tube 175 is supported by the mount 107 and aligned with the transfer tube 46.

The transfer tube 46 has its terminated end attached by a suitable adhesive such as epoxy, for example, to a pinion 176, which is rotatably supported in two bearing plates 177 and 178. The bearing plates 177 and 178 are secured to a base 179 by bolts 180 and nuts 181.

The pinion 176 has its teeth mesh with teeth on a rack 182 (see FIG. 29), which is connected to the end of a piston rod 183 of an air cylinder 184. Thus, when the piston rod 183 is extended, the pinion 176 is rotated clockwise (as viewed in FIG. 29) to rotate the end of the transfer tube 46 180° so that the position of the J-nut 11 (see FIG. 30) is opposite to that when the piston rod 183 (see FIG. 29) is not extended. Therefore, by controlling the position of the piston rod 183, the J-nut 11 may have the crown 14 either above or below the remainder of the J-nut 11.

Figure 29:
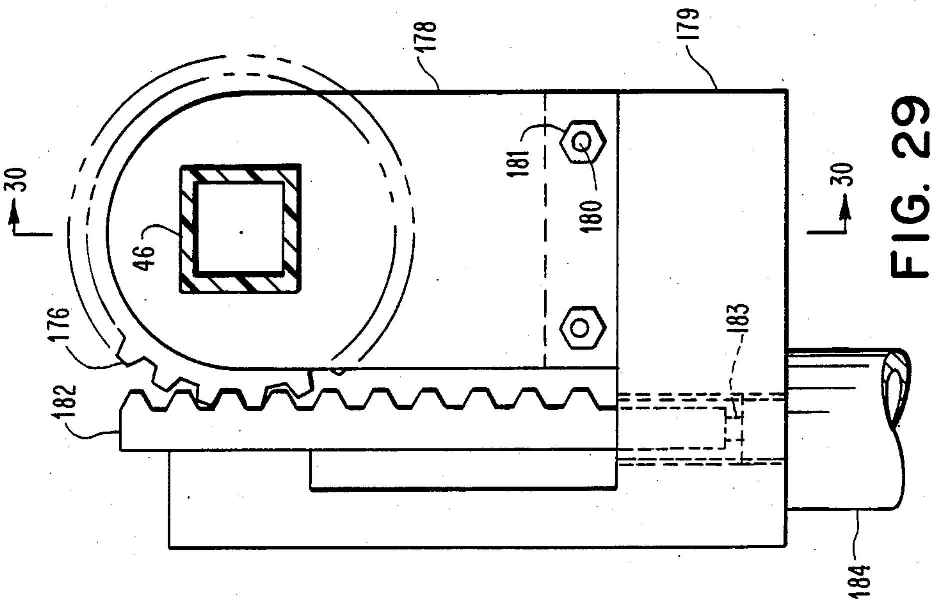
FIG. 29 is an end elevational view of modification of a portion of the feeder mechanism of FIG. 18.

While this modification has particular utility with a robot, it could also be employed by the installer through another trigger, for example, controlling the flow of pressurized air from the source 115 (see FIG. 21) to the air cylinder 184 (see FIG. 29). With this modification, altering the position of the saddle 58 (see FIG. 1) is not necessary.

An advantage of this invention is that it enables insertion of a clip into a hole in an element in a single plane in which the clip has a crown with the crown being either above or below the remainder of the clip. Another advantage of this invention is that a clip having a crown on one side can be selectively oriented with the crown either above or below the remainder of the clip and still be inserted within a hole by the same tool. A further advantage of this invention is that a clip may be inserted over an edge of an element or into a hole of an element with a single tool.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A tool for inserting a clip having a crown on one side into a hole in a portion of an element in a single plane so that portions of an inserted clip engage opposite sides of the portion of the element at a predetermined position including:

support means having disposition means for disposition in a hole in an element in which a clip is to be inserted;

said support means having first passage means to receive a clip in a specific orientation;

said disposition means having second passage means cooperating with said first passage means to receive a portion of a clip received in said first passage means;

stopping means to stop a clip received in said first passage means in a specific orientation at a selected position in said first passage means and said second passage means;

and advancing means for advancing a stopped clip from its selected position in said first passage means and said second passage means into a hole in which said disposition means is disposed after said stopping means has stopped a clip.

2. The tool according to claim 1 including positioning means to selectively position a clip with its crown above or below the remainder of the clip.

3. The tool according to claim 2 in which said advancing means includes rotatable means.

4. The tool according to claim 3 in which said stopping means is carried by said rotatable means.

5. The tool according to claim 4 in which said rotatable means includes:

a pair of rotatably mounted discs spaced from each other;

and each of said discs has means for engaging a stopped clip in said first passage means for advancing the stopped clip.

6. The tool according to claim 5 in which said disposition means includes means extending from said support means and having said second passage means.

7. The tool according to claim 1 in which said advancing means includes rotatable means.

8. The tool according to claim 7 in which said stopping means is carried by said rotatable means.

9. The tool according to claim 8 in which said rotatable means includes:

a pair of rotatably mounted discs spaced from each other;

and each of said discs has means for engaging a stopped clip in said first passage means for advancing the stopped clip.

10. The tool according to claim 9 in which said disposition means includes means extending from said support means and having said second passage means.

11. The tool according to claim 8 in which said disposition means includes means extending from said support means and having said second passage means.

12. The tool according to claim 7 in which said disposition means includes means extending from said support means and having said second passage means.

13. The tool according to claim 2 in which said disposition means includes means extending from said support means and having said second passage means.

14. The tool according to claim 1 in which said disposition means includes means extending from said support means and having said second passage means.

15. A tool for inserting a clip having a crown on one side at a predetermined position on a portion of an element with portions of the clip on opposite sides of the portion of the element including:

support means having orientation means for cooperating with a portion of an element that is to have portions of a clip disposed on opposite sides thereof at a predetermined position to orient said support means at a selected position relative to the portion of the element;

said orientation means including:

first means for disposition in a hole in a portion of an element in a single plane when the predetermined position of a clip is a clip inserted into the hole in the portion of the element in the single plane so that portions thereof are on opposite sides of a portion of an element;

and second means for engaging a portion of the element in the single plane having the hole and cooperating with said first means when said first means is disposed in the hole in the portion of the element in the single plane to orient said support means to insure that a clip is advanced into the hole so as to have portions thereof on opposite sides of the portion of the element in the single plane and to engage an edge of the hole;

said second means engaging a portion of the element when the predetermined position of a clip on opposite sides of an element is a clip inserted at an edge of a portion of an element so that portions thereof are on opposite sides of the portions of the element;

said support means having first passage means to receive a clip in a specific orientation;

said first means of said orientation means having second passage means cooperating with said first passage means to receive a portion of a clip received in said first passage means;

stopping means to stop a clip received in said first passage means in a specific orientation at a selected position in said first passage means and said second passage means;

and advancing means for advancing a stopped clip from its selected position in said first passage means and said second passage means to its predetermined position on opposite sides of the portion of the element.

16. The tool according to claim 15 including positioning means to selectively position a clip with its crown above or below the remainder of the clip.

17. The tool according to claim 16 in which said advancing means includes rotatable means.

18. The tool according to claim 15 in which said advancing means includes rotatable means.

19. A method of inserting into a hole in an element in a single plane a clip having a crown on one side including:

orienting a clip in a specific orientation in first passage means in support means of a tool;

stopping a clip at a selected position in the first passage means and in second passage means in locator means of the support means of the tool, the second passage means cooperating with the first passage means to receive a portion of a clip;

disposing the locator means in a hole in an element in a single plane in which a clip is to be mounted after a clip is stopped at the selected position;

and advancing a stopped clip from its selected position into a hole in an element in a single plane into which a stopped clip is to be inserted after the locator means has been disposed in the hold in which a stopped clip is to be inserted.

20. The method according to claim 19 including selectively orienting each clip in the first passage means in the support means of the tool so that its crown is above or below the remainder of each clip when positioned in the hole even though all clips are initially fed from feeder means in the same orientation.

* * * * *

UNITED STATES PATENT AND TRADEMARK OFFICE

CERTIFICATE OF CORRECTION

PATENT NO. : 4,707,908

DATED : November 24, 1987

INVENTOR(S) : Paul R. Everhard et al

It is certified that error appears in the above-identified patent and that said Letters Patent is hereby corrected as shown below:

Column 8, line 56, "FIGS." should read -- FIG. --.

Column 8, line 61, "4" should read -- 14 --.

Column 14, line 51, "FIGS." should read --FIG. --.

Signed and Sealed this

Tenth Day of May, 1988

*Attest:*

DONALD J. QUIGG

*Attesting Officer*

*Commissioner of Patents and Trademarks*